United States Patent [19]
Walters

[11] Patent Number: 6,010,770
[45] Date of Patent: Jan. 4, 2000

[54] PATTERNED RETROREFLECTIVE FILM AND METHODS TO PRODUCE

[75] Inventor: Glenn J. Walters, Duxbury, Mass.

[73] Assignee: Advanced Deposition Technologies, Inc., Taunton, Mass.

[21] Appl. No.: 08/955,259

[22] Filed: Oct. 21, 1997

[51] Int. Cl.[7] ..................................................... B32B 3/00
[52] U.S. Cl. ........................ 428/209; 428/40.9; 428/42.1; 428/67; 428/172; 428/195; 428/323; 428/332; 428/337; 428/424.6; 428/480; 428/913; 359/530; 264/1.9; 156/60; 156/181
[58] Field of Search .................................. 428/172, 178, 428/332, 337, 913, 161, 424.6, 195, 40.9, 42.1, 67, 323, 457, 328, 480, 209; 359/530; 264/214, 1.9, 1.1, 1.38, 1.7; 156/60, 166, 181

[56] References Cited

U.S. PATENT DOCUMENTS

| | | | |
|---|---|---|---|
| 4,801,193 | 1/1989 | Martin | 350/103 |
| 5,229,882 | 7/1993 | Rowland | 359/530 |

*Primary Examiner*—Deborah Jones
*Assistant Examiner*—Abraham Bahta
*Attorney, Agent, or Firm*—Wolf, Greenfield & Sacks, P.C.

[57] ABSTRACT

A laminate structure of a retroreflective film includes one layer of a prismatic plastic film laminated to a heat sealable, white polyester film having a pattern of aluminum deposited such that the resulting laminate is very cost effective to produce and has superior whiteness properties when compared to conventional films.

22 Claims, 3 Drawing Sheets

PATTERNED RETROREFLECTIVE FILM AND METHODS TO PRODUCE

BACKGROUND OF THE INVENTION

Retroreflective films are widely used for highway and personal safety products. Their primary function is to reflect a high percentage of light projected from a light source back in the general direction of the light source. The brightness, i.e., percentage of light reflected, and color, e.g., whiteness, of these materials are important factors and frequently part of the specification. For example, the Department of Transportation (DOT) sets rules governing the use of retroreflective films on tractor trailers ambulances highway safety cones and barrels. DOT standards often require these materials to be produced in colors other than white which are highly visible during the day. For example, bright orange or yellow are used on ambulances, as well as on highway safety cones and barrels.

Many conventional materials use a construction of glass beads, which provide substantial retroreflectivity, deposited in a pattern on a white substrate to permit a white background to be present in about 30% of the area. Other conventional materials use a prismatic or corner-cube structure to achieve a high retroreflectivity. Rowland has disclosed in U.S. Pat. No. 5,229,882, issued Jul. 20, 1993, a structure having improved properties of retroreflectivity and whiteness. However the disclosed film is costly and difficult to produce in large quantities.

Conventionally, a plastic film of polyvinyl chloride (PVC) or polyethylene teraphthalate (PET) is embossed using any one of a variety of methods known in the art. The embossed pattern creates on a surface of the film a plurality of corner-cubes or prisms, each of which reflects light projected from a light source back to the light source. Such patterns are well known in the art of light reflective bodies and materials. In some conventional materials, a layer of metal is vacuum deposited onto the embossed surface of the film to improve the reflectivity. However, the metallization layer also changes the color of the resultant material. Usually metallization darkens the color. Rowland suggests the metallization be vapor deposited in a pattern in order to improve the color and brightness of the final product. Areas having metal deposited thereon are highly reflective while in other areas where metal is absent, the substrate color predominates. However, in practice it is very difficult to apply precise patterns of metal to the prisms either directly using a pattern metallized printing process or using a traditional caustic removal process. The prisms interfere with either the caustic application or the pattern metallization process. For example, caustic may collect in recesses of the prism structure, resulting in excess removal of material in some areas.

Rowland further teaches enhancing the photometric properties of non-metallized prisms by adhering another film to the metallized surface of the prism embossed film using a thin layer of an adhesive which is white in color. This process is costly and the thinness of the adhesive makes it difficult to obtain high levels of whiteness and brightness.

SUMMARY OF THE INVENTION

The present invention provides an improved retroreflective film and method of making same.

The invention may be embodied in a retroreflective film. A retroreflective film according to the invention includes a substrate having a retroreflective surface relief pattern formed on one surface, thereof. The retroreflective film further includes a pattern metallized structure including a base film of a desired color and a metal film formed in a pattern disposed to one side thereof. The pattern metallized structure is laminated to the substrate with the metal film disposed between the base film and the substrate.

According to another embodiment of the invention, there is provided a method of making a retroreflective film. The method includes forming on a surface of a substrate a retroreflective surface relief pattern. The method further includes metallizing portions of a structure including a heat sealable film, forming a metallization pattern thereon. Finally, the structure is heat sealed to the substrate film.

BRIEF DESCRIPTION OF THE DRAWINGS

The following detailed description will be more fully understood when read in connection with the drawings, in which like reference designations denote like elements, and in which.

DETAILED DESCRIPTION

Figure 1:
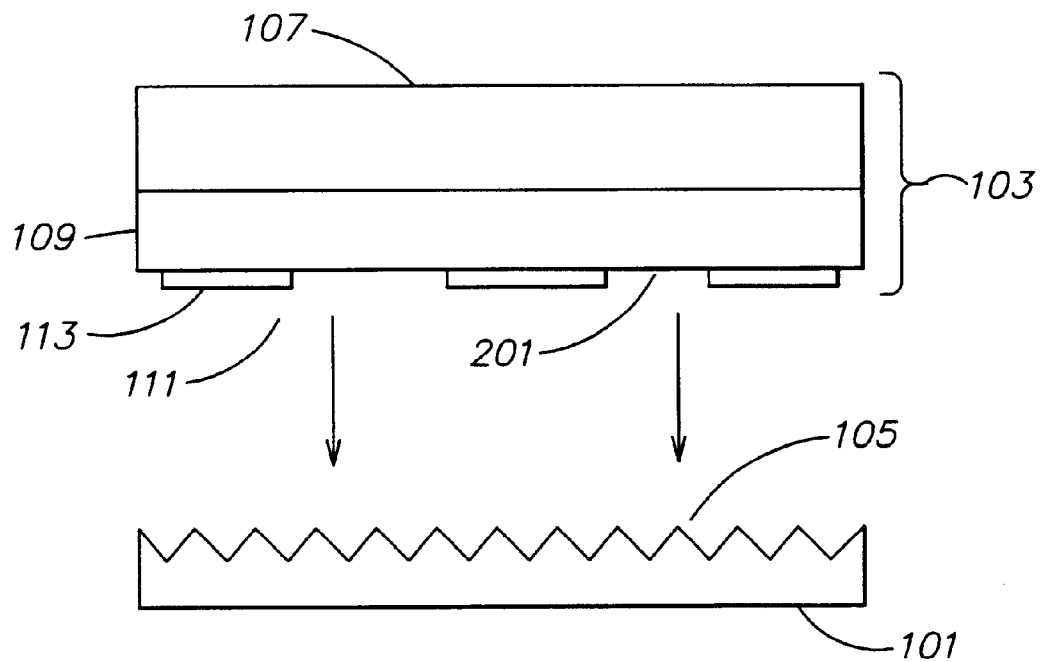
FIG. 1 is a side view of one embodiment of the invention, before heat sealing.

What has been discovered and developed is a product which can be produced less expensively than by vapor depositing a patterned metal layer on a prism embossed material either directly or indirectly and which delivers superior results having improved whiteness and brightness. Also discovered is a process particularly suitable for making the improved product.

The starting material for one embodiment of the invention is a conventional embossed prism material 101 of any suitable substrate material and prism geometry. Suitable substrate materials include PVC, PET, etc. According to this embodiment, a pattern metallized structure 103 is heat laminated to the prism side 105 of the embossed prism material 101. The resultant lamination does not require adhesives for bonding since it instead relies upon heat and pressure to physically bond the pattern metallized structure 103 to the prism sheet. One type of pattern metallized structure 103 includes a white polyester base film 107 which includes on a surface thereof a heat sealable coating 109 such as OL from Dupont. Another type of pattern metallized structure 103 is a heat sealable film 109, for example, an extruded co-polymer such as ICI's 850 film, polyethylene or another heat sealable film, on a polyester base film 107. The materials for both of these embodiments are standard products specifically used for heat sealability. The heat sealable side 111 of these films is a heat sealable film 109 which has a lower softening temperature than the polyester base film 107. In this embodiment a patterned metal layer is applied to the heat sealable side 111 of these films, for example by pattern metallized printing or by caustic removal processes.

Figure 2:
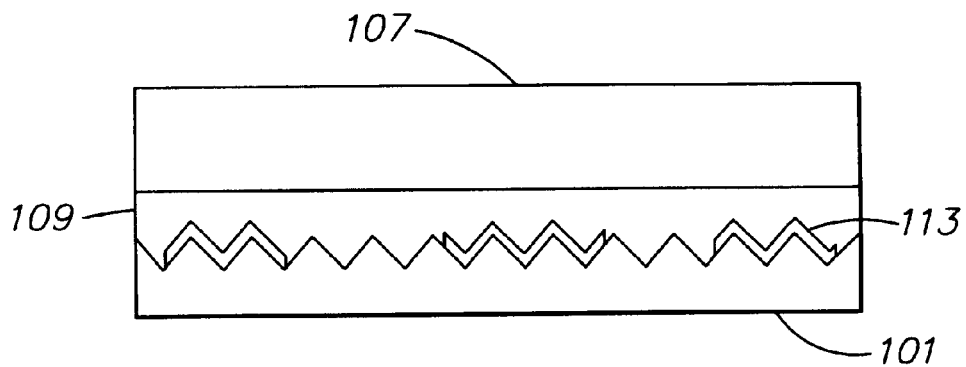
FIG. 2 is a side view of the embodiment of FIG. 1, after heat sealing.

Applying the heat sealable side of the coated film to the embossed material and then applying heat and pressure to laminate them together as shown in FIG. 2 does not appreciably distort the embossed prism.

Regardless of which conventional base film 107 or heat sealable coating 109 is used, all known such materials can be readily pattern metallized using either direct pattern metallized printing or a demetallization process such as by printing a caustic onto the metal layer 113 to remove selected portions of the metal layer 113. Both processes now routinely achieve 100 lines per inch of resolution or finer. Resolution of 100 lines per inch or finer is desired for maintaining a high degree of consistency of the photometric properties of the resulting retroreflective film.

The unmetallized regions 201 of the inventive structure account for its improved whiteness while the metal layer 113 accounts for its high reflectivity. Unlike the prior art, which uses a white adhesive as the bonding agent between a backing film and the prism film, this aspect of the invention relies upon the superior whiteness of the heat sealable film which is subsequently pattern metallized. For instance, using a white polypropylene base film 107, the thickness of the film is 1.5 nil and the resultant whiteness and opacity of the film is significantly better than that provided by the substantially thinner layer of white adhesive used in prior art. Thus, more white light is returned to the source, rather than being absorbed or passing through as happens in conventional structures with poorer whiteness or lower opacity. The inventive structure does not require the designer to choose between a thin adhesive layer having better adhesive properties and a thick layer having high whiteness and opacity. Moreover, the costs associated with the laminated structure are lower than those associated with a similar adhesive based structure.

The metal deposition process is responsible for a significant cost difference due to the thickness of the material on which the metal layer is deposited. In the prior art a very thick layer of prismatic film is metallized. For instance, many of these embossed prismatic films are as thick as 17 mil. Rolls of such thick films carry inherently short lengths of film, perhaps less than 3,000 feet, in order to keep the roll diameter manageable. The run time to process each roll of film according to the prior art is therefore very short, being proportional to the length of film on the roll; perhaps only ten minutes. However, the total production time is about one hour due to the time needed to establish the necessary level of vacuum and other preparation time. Deposition costs go down dramatically by increasing the run time, achieved by running thinner films. The combined base film 107 and heat sealable layer 109 used in connection with the invention is preferably between 0.5 mil and 1.5 mil. The resultant increase in length to over 30,000 feet of film on a manageable roll and consequent increase in run time reduces the cost for metallizing to less than one tenth of the cost to use 17 mil materials. Moreover, since less time is spent establishing vacuum and preparing, while more time is spent metallizing, higher volumes of product can be made in a given time period.

Thus, the inventive retroreflective lamination has intrinsically superior photometric properties, better consistency of reflective patterns and better overall quality than conventional materials. Moreover, the process for producing the lamination more readily produces large volumes at lower costs.

Figure 3:
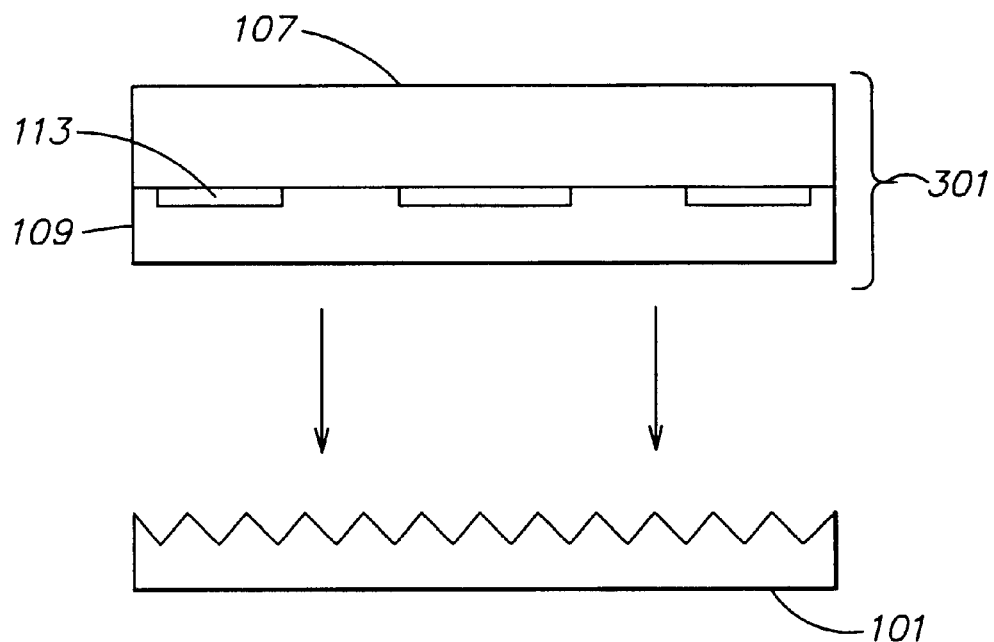
FIG. 3 is a side view of another embodiment of the invention, before heat sealing.
Figure 4:
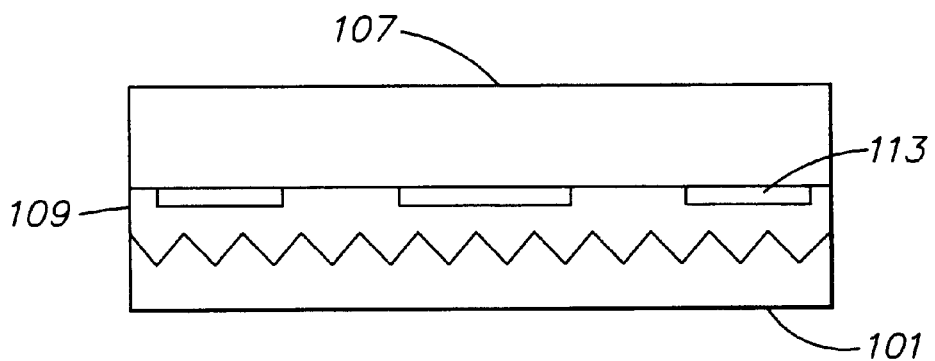
FIG. 4 is a side view of the embodiment of FIG. 3, after heat sealing.

Another embodiment of the invention, as shown in FIG. 3, has a pattern metallized structure 301 in which the metal layer 113 is disposed between the base film 107 and heat sealable coating 109. This structure is produced by pattern metallizing the base film 107 before the heat sealable coating 109 is applied to make the pattern metallized structure 301. The structure after heat lamination is an shown in FIG. 4.

Figure 5:
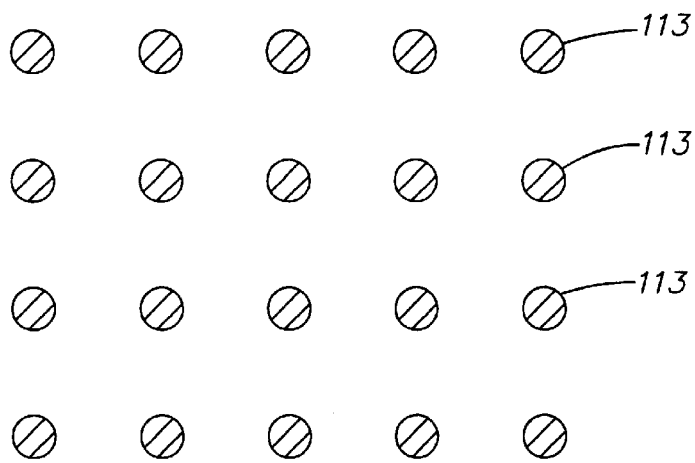
FIGS. 5, 6, and 7 are plan views of the embodiments of FIGS. 1–4, showing various metallization patterns.
Figure 6:
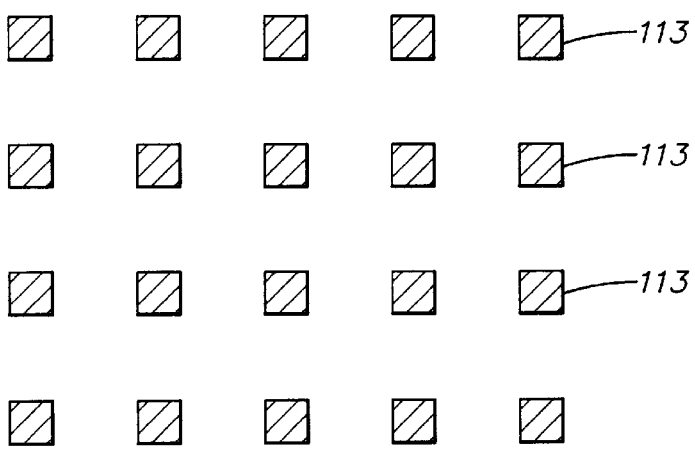
Figure 7:
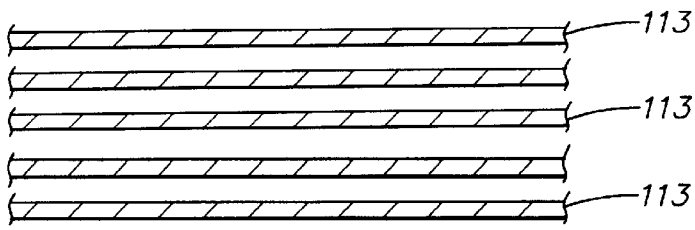

The patterns with which the metal layer 113 may be formed are essentially unlimited. Some examples are illustrated in FIGS. 5, 6 and 7. A blanket of metal dots is shown in FIG. 5; FIG. 6 shows a continuous grid structure; and FIG. 7 shows a pattern of closely spaced fine lines. Any of these patterns may be formed with feature spacings of 0.01" or finer. Moreover, the pattern itself may be applied within regions which form recognizable shapes such as logos, words, symbols, etc.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto.

What is claimed is:

1. A retroreflective film comprising:
   a first film including a substrate having a retroreflective surface relief pattern formed on one surface, thereof; and
   a second film less than 1.5 mils thick, whereby a roll of the second film of a given diameter is longer than a roll of film greater than 1.5 mils thick of the given diameter, thus improving manufacturing efficiency, the second film having a pattern metallized structure including
   a base film of a desired color and
   a metal film formed on one side of the base film, in a pattern, the second film being laminated to the first film with the metal film disposed between the base film and the substrate.

2. A retroreflective film, made by a process comprising steps of;
   forming on a surface of a substrate a retroreflective surface relief pattern;
   metallizing portions of a structure including a heat sealable film less than 1.5 mils thick, whereby a roll of the second film of a given diameter is longer than a roll of film greater than 1.5 mils thick of the given diameter, thus improving manufacturing efficiency, the heat sealable film forming a metallization pattern thereon; and
   heat sealing the structure to the substrate.

3. The film of claim 1, the second film further comprising:
   a heat sealable film, the heat sealable film disposed between the metal film and the base film; wherein the metal film is formed on the heat sealable film.

4. The film of claim 1, wherein the pattern of the metal film includes features having a resolution of about 100 lines per inch or finer.

5. The film of claim 4, wherein the pattern includes lines of metal spaced about 100 lines per inch or closer.

6. The film of claim 4, wherein the pattern includes dots of metal spaced about 100 lines per inch or closer.

7. The film of claim 4, wherein the pattern includes a grid of metal lines spaced about 100 lines per inch or closer along at least one axis.

8. The film of claim 1, wherein the base film is polypropylene.

9. The film of claim 8, wherein the base film is white.

10. The film of claim 9, wherein the base film is no thicker than about 1.5 mil.

11. The film of claim 3, wherein the base film and heat sealable film are together no thicker than about 1.5 mil.

12. The film of claim 11, wherein the base film and heat sealable film are together no thinner than about 0.5 mil.

13. The film of claim 12, wherein the base film is white polypropylene.

14. A retroreflective film comprising:

a retroreflective substrate; and a pattern metallized structure including a patterned metal film on a heat sealable structure less than 1.5 mils thick, whereby a roll of the second film of a given diameter is longer than a roll of film greater than 1.5 mils thick of the given diameter, thus improving manufacturing efficiency;

the substrate and pattern metallized structure bonded together without adhesive.

15. The film of claim 14, wherein the pattern includes features having a resolution of about 100 lines per inch or finer.

16. The film of claim 15, wherein the pattern includes lines of metal spaced about 100 lines per inch or closer.

17. The film of claim 15, wherein the pattern includes dots of metal spaced about 100 lines per inch or closer.

18. The film of claim 15, wherein the pattern includes a grid of metal lines spaced about 100 lines per inch or closer along at least one axis.

19. The film of claim 14, wherein the pattern metallized structure is no thicker than about 1.5 mil.

20. The film of claim 19, wherein the heat sealable structure comprises:

a base film; and a heat sealable coating on the base film;

the patterned metal film disposed on the heat sealable coating.

21. The film of claim 19, wherein the heat sealable structure comprises:

a pair of coextruded polymers, one having a lower melt point than another, the patterned metal film disposed on the one having the lower melt point.

22. The film of claim 21, wherein the heat sealable structure is no thinner than about 0.5 mil.

* * * * *